(12) United States Patent
Iwasa et al.

(10) Patent No.: US 10,173,203 B2
(45) Date of Patent: Jan. 8, 2019

(54) METHOD FOR PRODUCING ALUMINOSILICATE CATALYST, ALUMINOSILICATE CATALYST, AND METHOD FOR PRODUCING MONOCYCLIC AROMATIC HYDROCARBONS

(71) Applicant: JX Nippon Oil & Energy Corporation, Tokyo (JP)

(72) Inventors: Yasuyuki Iwasa, Tokyo (JP); Masahide Kobayashi, Tokyo (JP); Shinichiro Yanagawa, Tokyo (JP)

(73) Assignee: JXTG Nippon Oil & Energy Corporation, Tokyo (JP)

(*) Notice: Subject to any disclaimer, the term of this patent is extended or adjusted under 35 U.S.C. 154(b) by 0 days.

(21) Appl. No.: 15/129,694

(22) PCT Filed: Apr. 3, 2015

(86) PCT No.: PCT/JP2015/060628
§ 371 (c)(1),
(2) Date: Sep. 27, 2016

(87) PCT Pub. No.: WO2015/152406
PCT Pub. Date: Oct. 8, 2015

(65) Prior Publication Data
US 2017/0189894 A1 Jul. 6, 2017

(30) Foreign Application Priority Data
Apr. 4, 2014 (JP) ................. 2014-078010

(51) Int. Cl.
| | | |
|---|---|---|
| *B01J 29/06* | (2006.01) | |
| *B01J 29/70* | (2006.01) | |
| *B01J 37/02* | (2006.01) | |
| *B01J 37/28* | (2006.01) | |
| *C10G 47/16* | (2006.01) | |
| *B01J 29/40* | (2006.01) | |
| *B01J 29/80* | (2006.01) | |
| *B01J 37/04* | (2006.01) | |
| *B01J 37/08* | (2006.01) | |
| *C10G 11/05* | (2006.01) | |
| *B01J 38/14* | (2006.01) | |
| *B01J 29/90* | (2006.01) | |
| *B01J 23/882* | (2006.01) | |
| *B01J 27/19* | (2006.01) | |

(52) U.S. Cl.
CPC .......... *B01J 29/7007* (2013.01); *B01J 29/06* (2013.01); *B01J 29/40* (2013.01); *B01J 29/70* (2013.01); *B01J 29/80* (2013.01); *B01J 29/90* (2013.01); *B01J 37/0205* (2013.01); *B01J 37/04* (2013.01); *B01J 37/08* (2013.01); *B01J 37/28* (2013.01); *B01J 38/14* (2013.01); *C10G 11/05* (2013.01); *C10G 47/16* (2013.01); *B01J 23/882* (2013.01); *B01J 27/19* (2013.01); *B01J 37/0201* (2013.01); *B01J 2229/18* (2013.01);
*B01J 2229/186* (2013.01); *B01J 2229/20* (2013.01); *B01J 2229/36* (2013.01); *B01J 2229/42* (2013.01); *C10G 2400/30* (2013.01)

(58) Field of Classification Search
CPC ... B01J 29/06; B01J 29/40; B01J 29/70; B01J 29/80; B01J 2229/18; B01J 2229/186; B01J 2229/20; B01J 37/04; B01J 37/08; B01J 37/0201; B01J 37/0205; B01J 37/28
USPC ................ 502/60, 64, 71, 77, 214
See application file for complete search history.

(56) References Cited

U.S. PATENT DOCUMENTS

| | | | |
|---|---|---|---|
| 4,128,592 A * | 12/1978 | Kaeding | B01J 29/40 502/84 |
| 4,326,994 A | 4/1982 | Haag et al. | |
| 2007/0032690 A1* | 2/2007 | Ghosh | B01J 29/40 585/446 |
| 2008/0293561 A1* | 11/2008 | Long | B01J 29/06 502/65 |
| 2010/0113850 A1* | 5/2010 | Ghosh | B01J 29/40 585/466 |
| 2013/0267749 A1 | 10/2013 | Yanagawa et al. | |
| 2014/0005033 A1* | 1/2014 | Ghosh | C01B 39/026 502/77 |
| 2014/0024866 A1* | 1/2014 | Springs | C10G 1/086 585/240 |
| 2014/0058181 A1* | 2/2014 | Frauenrath | B01J 29/40 585/640 |
| 2014/0194276 A1* | 7/2014 | Nesterenko | B01J 21/16 502/61 |

FOREIGN PATENT DOCUMENTS

| | | |
|---|---|---|
| CN | 1465527 A | 1/2004 |
| EP | 1867388 A1 | 12/2007 |
| EP | 2659971 A1 | 11/2013 |
| EP | 2659972 A1 | 11/2013 |
| JP | S56130233 A | 10/1961 |
| JP | H10-36860 A | 2/1998 |
| JP | 2010104878 A | 5/2010 |
| JP | 2011190306 A | 9/2011 |
| JP | 2012139641 A | 7/2012 |
| JP | 5254789 B2 | 8/2013 |

OTHER PUBLICATIONS

Int'l Search Report dated May 12, 2015 in Int'l Application No. PCT/JP2015/060628.

(Continued)

*Primary Examiner* — Elizabeth D Wood
(74) *Attorney, Agent, or Firm* — Panitch Schwarze Belisario & Nadel LLP (57) ABSTRACT

A method is provided for producing an aluminosilicate catalyst. The method includes a first phosphorus treatment step of treating a crystalline aluminosilicate with a first phosphorus compound, a mixing and firing step of mixing the phosphorus-treated crystalline aluminosilicate obtained in the first phosphorus treatment step with a binder and then performing firing to form an aluminosilicate mixture, and a second phosphorus treatment step of treating the aluminosilicate mixture with a second phosphorus compound.

9 Claims, 1 Drawing Sheet

(56) References Cited

OTHER PUBLICATIONS

Extended European Search Report dated Oct. 27, 2017 in EP Application No. 15772932.8.
Office Action dated Nov. 20, 2018 in JP Application No. 2016511646.

* cited by examiner

# METHOD FOR PRODUCING ALUMINOSILICATE CATALYST, ALUMINOSILICATE CATALYST, AND METHOD FOR PRODUCING MONOCYCLIC AROMATIC HYDROCARBONS

CROSS-REFERENCE TO RELATED APPLICATION

This application is a Section 371 of International Application No. PCT/JP2015/060628, filed Apr. 3, 2015, which was published in the Japanese language on Oct. 8, 2015, under International Publication No. WO 2015/152406 A1, and the disclosure of which is incorporated herein by reference.

TECHNICAL FIELD

The present invention relates to a method for producing an aluminosilicate catalyst, an aluminosilicate catalyst, and a method for producing monocyclic aromatic hydrocarbons having a carbon number of 6 to 8.

Priority is claimed on Japanese Patent Application No. 2014-078010, filed Apr. 4, 2014, the content of which is incorporated herein by reference.

BACKGROUND ART

In recent years, technology has been proposed that enables the efficient production of monocyclic aromatic hydrocarbons having a carbon number of 6 to 8 (such as benzene, toluene and crude xylene, which are hereafter jointly referred to as "BTX"), which can be used as high-octane gasoline base stocks or petrochemical feedstocks and offer significant added value, from feedstock oils containing a polycyclic aromatic hydrocarbon fraction such as light cycle oil (hereafter also referred to as "LCO"), which is a cracked light oil produced in a fluid catalytic cracking (hereafter also referred to as "FCC") apparatus.

One example of a known method for producing BTX from a polycyclic aromatic fraction is a method in which a feedstock oil is brought into contact with a catalyst, and a cracking and reforming reaction is induced to obtain a product containing monocyclic aromatic hydrocarbons having a carbon number of 6 to 8.

Known reaction systems for conducting the cracking and reforming reaction include various processes such as fixed bed, fluidized bed and moving bed systems, but a fixed bed system is advantageous for reasons including inexpensive construction costs and operating costs.

When a process such as the aforementioned cracking and reforming reaction is conducted to produce monocyclic aromatic hydrocarbons, a zeolite catalyst having acid sites (a crystalline aluminosilicate catalyst) is typically used as the catalyst. At the laboratory level, this type of zeolite catalyst is able to maintain its performance in a favorable state, and is therefore typically used as is, without adding a binder. However, in a fixed bed reaction tower, particularly at the level of an actual production plant, in order to compensate for a lack of strength, a binder is used to create a molded catalyst, despite this causing a slight deterioration in the catalyst performance.

In other words, in order to ensure that the catalyst does not create obstacles to operation, for example due to the catalyst powdering during operation and disturbing the flow of the oil through the reaction tower, or due to the powdered catalyst frequently blocking the filter provided at the outlet of the reaction tower, a molded zeolite catalyst prepared using a binder or the like is often used.

Examples of this type of zeolite catalyst that has been molded using a binder include the catalyst disclosed in Patent Document 1. The zeolite catalyst disclosed in Patent Document 1 is used for alkylating mainly aromatic compounds, such as the methylation of toluene, and is formed by treating a zeolite with a phosphorus compound to form a phosphorus-treated zeolite, heating the phosphorus-treated zeolite at a temperature of 300° C. to 400° C., mixing the heated phosphorus-treated zeolite with an alumina-containing binder to form a zeolite-binder mixture, and then heating the zeolite-binder mixture at a temperature of 400° C. or higher.

PRIOR ART LITERATURE

Patent Documents

Patent Document 1: Japanese Patent No. 5,254,789

DISCLOSURE OF INVENTION

Problems to be Solved by the Invention

However, with zeolite catalysts having an added binder, significant coke formation occurs due to the acid sites within the binder. When coke formation becomes more significant in this manner, it is necessary to shorten the catalyst "reaction-regeneration" cycle, particularly in the case of fixed beds, and therefore the operating costs increase and the merits of using a fixed bed tend to diminish. Further, frequent repetition of the regeneration process tends to cause a reduction in the number of acid sites within the aluminosilicate catalyst due to hydrothermal degradation, resulting in a reduction in the activity of the catalyst itself, which is undesirable from the viewpoint of the catalyst lifespan.

The present invention has been developed in light of the above circumstances, and has an object of providing a method for producing an aluminosilicate catalyst in which by suppressing coke formation and suppressing hydrothermal degradation of the catalyst itself, any deterioration in the activity of the zeolite catalyst can be suppressed, and the hydrothermal stability can be enhanced, as well as providing a method for producing monocyclic aromatic hydrocarbons having a carbon number of 6 to 8 using this aluminosilicate catalyst.

Means for Solving the Problems

A method for producing an aluminosilicate catalyst according to one aspect of the present invention has a first phosphorus treatment step of treating a crystalline aluminosilicate with a first phosphorus compound, a mixing and firing step of mixing the phosphorus-treated crystalline aluminosilicate obtained in the first phosphorus treatment step with a binder, and then performing firing to form an aluminosilicate mixture, and a second phosphorus treatment step of treating the aluminosilicate mixture with a second phosphorus compound.

Further, in the above method for producing an aluminosilicate catalyst, in the mixing and firing step, the phosphorus-treated crystalline aluminosilicate and the binder may be mixed and molded, and the thus obtained molded body then fired.

Furthermore, in the above method for producing an aluminosilicate catalyst, the crystalline aluminosilicate may contain at least one component selected from the group consisting of medium pore zeolites and large pore zeolites as the main component.

Further, in the above method for producing an aluminosilicate catalyst, the crystalline aluminosilicate may be a pentasil zeolite.

Furthermore, in the above method for producing an aluminosilicate catalyst, the crystalline aluminosilicate may be an MFI zeolite.

Further, in the above method for producing an aluminosilicate catalyst, the binder may contain alumina.

Furthermore, in the above method for producing an aluminosilicate catalyst, phosphoric acid may be used as the second phosphorus compound.

Further, in the above method for producing an aluminosilicate catalyst, following the second phosphorus treatment step, a heat treatment may be performed in an atmosphere containing water vapor.

An aluminosilicate catalyst according to another aspect of the present invention is obtained using the above method for producing an aluminosilicate catalyst.

A method for producing monocyclic aromatic hydrocarbons having a carbon number of 6 to 8 according to yet another aspect of the present invention has a cracking and reforming reaction step of bringing a feedstock oil having a 10 vol % distillation temperature of at least 140° C. and a 90 vol % distillation temperature of not more than 390° C. into contact with a monocyclic aromatic hydrocarbon production catalyst containing the above aluminosilicate catalyst packed in a fixed bed reactor, and reacting the feedstock oil to obtain a product containing monocyclic aromatic hydrocarbons having a carbon number of 6 to 8.

Further, in the above method for producing monocyclic aromatic hydrocarbons having a carbon number of 6 to 8, in the cracking and reforming reaction step, two or more fixed bed reactors may be used, and the cracking and reforming reaction and regeneration of the monocyclic aromatic hydrocarbon production catalyst may be repeated while periodically exchanging the fixed bed reactors.

Further, in the above method for producing monocyclic aromatic hydrocarbons having a carbon number of 6 to 8, the feedstock oil may be a light cycle oil or a partially hydrogenated product of the light cycle oil.

Furthermore, in the above method for producing monocyclic aromatic hydrocarbons having a carbon number of 6 to 8, the feedstock oil may be a thermally cracked heavy oil obtained from an ethylene production apparatus or a partially hydrogenated product of the thermally cracked heavy oil.

Effects of the Invention

The method for producing an aluminosilicate catalyst according to one aspect of the present invention enables the production of an aluminosilicate catalyst which suppresses coke formation and for which any deterioration in the activity of the catalyst is suppressed.

The aluminosilicate catalyst according to another aspect of the present invention can suppress the formation of coke, resulting in a superior catalyst for which any deterioration in the catalytic activity is suppressed.

Moreover, in the method for producing monocyclic aromatic hydrocarbons having a carbon number of 6 to 8 according to yet another aspect of the present invention, by using the aluminosilicate catalyst described above, coke formation can be suppressed, and the monocyclic aromatic hydrocarbons having a carbon number of 6 to 8 can be produced with good efficiency.

BEST MODE FOR CARRYING OUT THE INVENTION

The present invention is described below in further detail.

First is a description of a method for producing an aluminosilicate catalyst according to an embodiment of the present invention.

The aluminosilicate catalyst according to this embodiment is a catalyst formed by mixing and firing a crystalline aluminosilicate (a zeolite) and a binder, and can be used in a variety of reactions which mainly utilize the acid sites of the crystalline aluminosilicate.

[Crystalline Aluminosilicate]

Materials containing a medium pore zeolite and/or a large pore zeolite as the main component are preferred as the crystalline aluminosilicate, as such materials exhibit higher activity in reactions that utilize the acid sites, and for example are able to produce a higher yield of monocyclic aromatic hydrocarbons in the cracking and reforming reaction described below.

Medium pore zeolites are zeolites having a backbone structure composed of 10-membered rings, and examples of these medium pore zeolites include zeolites having AEL, EUO, FER, HEU, MEL, MFI, NES, TON and WEI type crystal structures. Among these, MFI type zeolites are preferred as they enable a greater increase in the yield of monocyclic aromatic hydrocarbons.

Large pore zeolites are zeolites having a backbone structure composed of 12-membered rings, and examples of these large pore zeolites include zeolites having AFI, ATO, BEA, CON, FAU, GME, LTL, MOR, MTW and OFF type crystal structures. Among these, BEA, FAU and MOR type zeolites are preferred in terms of industrial usability, and BEA type zeolites are particularly desirable as they enable a greater increase in the yield of monocyclic aromatic hydrocarbons.

Besides the above medium pore zeolites and large pore zeolites, the crystalline aluminosilicate may also contain small pore zeolites having a backbone structure composed of 10-membered rings or smaller, and extra large pore zeolites having a backbone structure composed of 14-membered rings or larger.

Examples of the small pore zeolites include zeolites having ANA, CHA, ERI, GIS, KFI, LTA, NAT, PAU and YUG type crystal structures.

Examples of the extra large pore zeolites include zeolites having CLO and VPI type crystal structures.

Further, the crystalline aluminosilicate may contain a pentasil zeolite as the main component. Pentasil zeolites are typified by H-ZSM-5, and are aluminosilicates constructed using a 5-membered ring (a pentasil backbone) as the smallest unit. In this type of pentasil zeolite, the molar ratio between silicon and aluminum (Si/Al ratio) can be altered in a broad range from 6 to ∞, and the solid acid content and the hydrophilic/hydrophobic balance can be freely controlled.

Further, pentasil zeolites also have other excellent properties, including an ability to control the acid/base balance by ion exchange.

Further, the crystalline aluminosilicate has a molar ratio between silicon and aluminum (Si/Al ratio) that is not more than 100, and preferably not more than 50. If the Si/Al ratio of the crystalline aluminosilicate exceeds 100, then the yield of monocyclic aromatic hydrocarbons tends to decrease.

Furthermore, in order to obtain a satisfactory yield of monocyclic aromatic hydrocarbons, the Si/Al ratio of the crystalline aluminosilicate is preferably at least 10.

[First Phosphoric Acid Treatment Step]

In the present embodiment, this type of crystalline aluminosilicate is treated with a first phosphoric acid compound to form a phosphorus-treated crystalline aluminosilicate. In other words, by treating the crystalline aluminosilicate with the first phosphoric acid compound, phosphorus is supported on the crystalline aluminosilicate, thereby forming a phosphorus-treated crystalline aluminosilicate (phosphorus-supporting crystalline aluminosilicate). In order to prevent impediments to the subsequent mixing and molding processes, the particle size of the crystalline aluminosilicate supplied to the above treatment is preferably adjusted to an appropriate size.

The particle size of the crystalline aluminosilicate can be adjusted by sieving, crystallization, molding, grinding, or spray drying or the like.

Examples of the first phosphoric acid compound include phosphoric acid ($H_3PO_4$), diammonium hydrogen phosphate (($NH_4$)$_2$HPO$_4$), ammonium dihydrogen phosphate (($NH_4$)$H_2PO_4$), and other water-soluble phosphate salts (such as sodium phosphate and potassium phosphate), and an appropriate compound may be selected and used in accordance with the properties and the like of the crystalline aluminosilicate that represents the treatment target. The use of diammonium hydrogen phosphate is preferred.

Further, these compounds are typically used by dissolution in water or the like and adjustment to an appropriate concentration.

Examples of the method used for treating the crystalline aluminosilicate with the first phosphoric acid compound, namely the method used for supporting phosphorus on the crystalline aluminosilicate, include conventional wet methods such as impregnation methods and spraying methods.

Further, following contact treatment with this type of aqueous solution of the first phosphoric acid compound, the phosphorus-treated crystalline aluminosilicate is obtained by performing a drying treatment and then a firing treatment. At this time, by evaporating substantially all of the water content from the aqueous solution of the first phosphoric acid compound, almost all of the phosphorus component within the first phosphoric acid compound can be supported on the crystalline aluminosilicate.

The drying temperature is typically at least 100° C., and preferably 110° C. or higher. The upper limit for the drying temperature is not more than 450° C., preferably not more than 400° C., and more preferably 350° C. or lower. Various conventional methods such as air firing or steam firing can be used as the firing treatment method. The firing temperature is typically at least 500° C., and preferably 550° C. or higher. The upper limit for the firing temperature is typically not more than 1,000° C., preferably not more than 900° C., and more preferably 800° C. or lower.

The phosphorus-treated crystalline aluminosilicate that has undergone this type of firing treatment may be used, as is, in the subsequent step, but in those cases where the firing treatment and the like causes an increase in the particle size of the crystalline aluminosilicate or partial powdering of the crystalline aluminosilicate, a grinding treatment or the like is preferably performed if necessary to adjust the particle size to an appropriate level before supplying the crystalline aluminosilicate to the subsequent step.

The phosphorus content of the phosphorus-treated crystalline aluminosilicate, namely the amount of supported phosphorus, reported as the mass of phosphorus atoms relative to a value of 100 mass % for the entire mass of the phosphorus-treated crystalline aluminosilicate, is preferably at least 0.1 mass % but not more than 10.0 mass %, more preferably at least 0.5 mass % but not more than 5.0 mass %, and still more preferably about 1.0 to 3.0 mass %.

By supporting phosphorus on the crystalline aluminosilicate in this manner, the strength (amount) of acid sites within the crystalline aluminosilicate can be adjusted, and hydrothermal degradation of the obtained catalyst can be suppressed.

In those cases where the aluminosilicate catalyst is used in a process such as the aforementioned cracking and reforming reaction for producing monocyclic aromatic hydrocarbons, in order to suppress coke formation, particularly in fixed beds, a cycle of "reaction→regeneration→reaction→regeneration . . . " is repeated. In this type of reaction and regeneration cycle, coke is decomposed and removed at high temperature by a firing treatment during regeneration, but this type of coke firing produces water. The heat and water during firing causes hydrothermal degradation of the aluminosilicate catalyst that can eliminate acid sites, resulting in a loss of activity and a deterioration in the catalyst performance.

In response to this type of phenomenon, the phosphorus supported on the crystalline aluminosilicate weakens the acid sites of the aluminosilicate catalyst, thereby suppressing hydrothermal degradation. Further, this can also inhibit the formation of coke. However, with this type of phosphorus supporting treatment, if the amount of supported phosphorus becomes too large, then the inherent catalytic activity provided by the acid sites tends to decrease, and therefore as described above, the phosphorus content is limited to not more than 10.0 mass %, and preferably not more than 5.0 mass %. Further, in order to suppress hydrothermal degradation, the amount of phosphorus supported is typically at least 0.1 mass %, and preferably 0.5 mass % or greater.

When phosphorus is supported in this manner, the acid sites of the crystalline aluminosilicate are adjusted, thereby suppressing the type of hydrothermal degradation described above.

Particularly in those cases where the obtained aluminosilicate catalyst is to be used as a catalyst for the production of monocyclic aromatic hydrocarbons as described below, the crystalline aluminosilicate may also include gallium and/or zinc in addition to the supported phosphorus. By including gallium and/or zinc, a more efficient BTX production can be anticipated.

Examples of crystalline aluminosilicates containing gallium and/or zinc include catalysts in which gallium is incorporated within the lattice framework of the crystalline aluminosilicate (crystalline aluminogallosilicates), catalysts in which zinc is incorporated within the lattice framework of the crystalline aluminosilicate (crystalline aluminozincosilicates), catalysts in which gallium is supported on the crystalline aluminosilicate (Ga-supporting crystalline aluminosilicates), catalysts in which zinc is supported on the crystalline aluminosilicate (Zn-supporting crystalline aluminosilicates), and catalysts including at least one of the above forms.

[Mixing and Firing Step for Forming Aluminosilicate Mixture]

Subsequently, the formed phosphorus-treated crystalline aluminosilicate is mixed with a binder, and the mixture is then dried and fired to form an aluminosilicate mixture.

[Binder]

There are no particular limitations on the binder, and any of various binders may be used, provided they do not impair the activity of the phosphorus-treated crystalline aluminosilicate described above. Specific examples of materials that can be used favorably as the binder include inorganic materials such as alumina, silica and titania, and other materials containing these inorganic materials. Among the various possibilities, alumina powder is preferred, as it exhibits excellent binding strength, meaning a comparatively small amount of the binder can be used to impart the phosphorus-treated crystalline aluminosilicate with sufficient binding strength to enable molding. In other words, provided the amount added of the binder can be kept to a minimum, any deterioration in the activity of the aluminosilicate catalyst due to addition and mixing of the binder can be suppressed.

However, alumina has more numerous acid sites, for example compared with silica, and therefore coke formation tends to become more noticeable. On the other hand, silica has a lower binding strength than alumina, meaning a larger amount must be added. Further, titania has even more acid sites than alumina, and is also expensive.

When alumina (alumina powder) is used as the binder, the blend ratio with the aforementioned phosphorus-treated crystalline aluminosilicate is important. In other words, as the amount of the binder is increased, better moldability is achieved and favorable mechanical strength can be obtained for the resulting aluminosilicate catalyst. On the other hand, as the amount of the binder is increased, the deterioration in activity of the aluminosilicate catalyst caused by the addition of the binder becomes more significant. The amount of the binder (alumina) contained within the aluminosilicate catalyst is preferably at least 5 mass % but not more than 50 mass %, and is more preferably at least 10 mass % but not more than 40 mass %.

However, the blend ratio between the alumina (alumina powder) and the phosphorus-treated crystalline aluminosilicate is not necessarily limited to the above mass ratio range, and may be set to any value as appropriate.

Further, in those cases where silica is used as the binder, the amount of the binder (silica) contained within the aluminosilicate catalyst is preferably at least 10 mass % but not more than 50 mass %, and is more preferably at least 15 mass % but not more than 40 mass %.

The binder such as the alumina (alumina powder) may be a binder that already contains phosphorus. However, when the binder is subjected to a phosphorus treatment with a phosphorus compound, the binder tends to degenerate, and there is a possibility that the performance of the binder may deteriorate. Accordingly, the type of phosphorus treatment using a phosphorus compound described above for treatment of the crystalline aluminosilicate is preferably not performed on the binder.

The mixing of the phosphorus-treated crystalline aluminosilicate and the binder may be performed, for example, by adding a liquid such as water or an organic solvent to the two components and then kneading the resulting mixture.

Subsequently, the thus obtained mixture (kneaded product) is molded into the desired shape using a molding device, and is then dried in the open atmosphere at a temperature of at least 100° C., and preferably 10° C. or higher. The molded body of the mixture may be in any of various forms, including granules or pellets. For example, when an extrusion molding apparatus is used as the molding device, the mixture can be molded into a circular cylindrical shape having any arbitrary diameter (for example, a diameter of 0.5 to 3 mm) and height.

Subsequently, the thus obtained dried material (molded product) is fired in the open atmosphere at a temperature of at least 500° C., and preferably 550° C. or higher, thus yielding a molded body of the aluminosilicate mixture.

[Second Phosphoric Acid Treatment Step]

Next, the molded body of the aluminosilicate mixture is treated with a second phosphorus compound to obtain the aluminosilicate catalyst.

In other words, by treating the aluminosilicate mixture with the second phosphoric acid compound, phosphorus is supported selectively and predominantly on the binder. Because the aluminosilicate mixture described above has already been molded, it may be used without further modification as the aluminosilicate mixture supplied to this treatment, but in those cases where the firing treatment and the like has caused an increase in the particle size of the aluminosilicate mixture or partial powdering of the mixture, a grinding treatment or the like is preferably performed if necessary to adjust the particle size to an appropriate level.

Examples of the second phosphoric acid compound include the same compounds as the first phosphoric acid compound, such as phosphoric acid ($H_3PO_4$), diammonium hydrogen phosphate (($NH_4$)$_2$$HPO_4$), ammonium dihydrogen phosphate (($NH_4$)$H_2PO_4$), and other water-soluble phosphate salts (such as sodium phosphate and potassium phosphate), and an appropriate compound may be selected and used in accordance with the properties and the like of the aluminosilicate mixture that represents the treatment target. Further, these compounds are typically used by dissolution in water or the like and adjustment to an appropriate concentration. Phosphoric acid can be used particularly favorably in those cases where alumina (alumina powder) is used as the binder. Phosphoric acid adheres selectively to the alumina binder, meaning the acid sites of the aluminosilicate can be left as is, while the acid sites of the binder are selectively weakened.

Examples of the method used for treating the molded body of the aluminosilicate mixture with the second phosphoric acid compound, namely the method used for supporting phosphorus on the aluminosilicate mixture, include conventional wet methods such as impregnation methods and spraying methods.

Further, following contact treatment with this type of aqueous solution of the second phosphoric acid compound, the aluminosilicate catalyst according to the present embodiment is obtained by performing a drying treatment and then a firing treatment. At this time, by evaporating substantially all of the water content from the aqueous solution of the second phosphoric acid compound, almost all of the phosphorus component within the second phosphoric acid compound can be supported on the aluminosilicate mixture.

The drying temperature is typically at least 100° C., and preferably 110° C. or higher. The upper limit for the drying temperature is not more than 450° C., preferably not more than 400° C., and more preferably 350° C. or lower. Various conventional methods such as air firing in the open air can be used as the firing treatment method. The firing temperature is typically at least 500° C., and preferably 550° C. or higher. The upper limit for the firing temperature is typically not more than 1,000° C., preferably not more than 900° C., and more preferably 800° C. or lower.

Further, following this type of firing treatment, the resulting fired product is preferably subjected to a steaming treatment (heat treatment in an atmosphere containing water vapor).

As is already known, by performing the above steaming treatment, Al that has highly active acid sites can be reduced (partially eliminated) in the catalyst. In other words, those acid sites which, although contributing to reaction, particularly in the initial steps (initial reaction stage), tend to promote catalyst degradation as a result of coke formation and adhesion (accumulation), can be reduced.

Accordingly, by using a catalyst that has been subjected to this type of treatment, although the reaction efficiency in the initial stages deteriorates slightly, catalyst degradation that occurs as the reaction proceeds can be suppressed. Further, because any reduction in the yield caused by catalyst degradation can be suppressed, the yield of the overall reaction process can be improved, despite the reduction in the amount of Al having highly active acid sites within the catalyst.

Furthermore, particularly in those cases where alumina is used as the binder, the amount of acid sites within the binder can be reduced (partially eliminated) within the fired product, and as a result, coke formation and adhesion (accumulation) on the catalyst can be inhibited.

Specific examples of preferred conditions for this type of steaming treatment include a heating temperature of at least 600° C. but not more than 900° C., and a temperature of at least 650° C. but not more than 850° C. is more preferred. If the temperature is less than 600° C., then the effect of the treatment in reducing acid sites is minimal, whereas if the temperature exceeds 900° C., then the costs required to perform the treatment increase considerably, which is also undesirable.

The water vapor concentration in the treatment atmosphere during the heating is preferably at least 10% but not more than 100%, and is more preferably at least 20%. In those cases where the water vapor concentration is less than 100%, examples of the coexistent gas include air or nitrogen.

These types of heating temperatures and water vapor concentrations may be selected as appropriate depending on the treatment time. In other words, when the heating temperature and water vapor concentration are high, the treatment time can be relatively short, whereas when the heating temperature and water vapor concentration are set lower, the treatment time must be lengthened relatively. The treatment time is preferably at least 10 minutes but less than 24 hours. If the treatment time is less than 10 minutes, then achieving uniform hydrothermal treatment conditions is difficult, whereas using a treatment time of 24 hours or longer occupies the apparatus for a long period, and is inefficient.

Specifically, if the heating temperature is set to at least 650° C. but not more than 850° C., and the water vapor concentration is set to at least 20%, then the treatment time can be set to at least 15 minutes but not more than about 5 hours.

Examples of apparatus that can be used for performing this type of heat treatment using water vapor include multistage kilns. In such cases, by performing the drying treatment and the firing treatment in the earlier stages, and then performing the heat treatment with water vapor in a later stage, the catalyst can be treated in a continuous manner. The heat treatment using water vapor may also be performed after the catalyst is packed into the reaction apparatus, or a batch-type heating device for performing the hydrothermal treatment may be used.

The aluminosilicate catalyst obtained in this manner may be used without further modification as a fixed bed catalyst, but in those cases where the firing treatment and the like has caused an increase in the particle size of the aluminosilicate catalyst or partial powdering of the catalyst, a grinding treatment or the like is preferably performed if necessary to adjust the particle size to an appropriate level The amount of additional phosphorus supported on the catalyst by the second phosphoric acid treatment step, reported as the mass of phosphorus atoms relative to a value of 100 mass % for the entire mass of the aluminosilicate catalyst obtained following the firing treatment, is preferably at least 0.1 mass % but not more than 10.0 mass %, more preferably at least 0.25 mass % but not more than 3 mass %, and still more preferably about 0.5 to 2.5 mass %. When phosphorus is supported on the aluminosilicate catalyst in this manner, because phosphorus has been supported on the crystalline aluminosilicate by the first phosphorus treatment step, the phosphorus from the second phosphorus treatment step is supported mainly on the binder. Accordingly, because the acid sites of the binder bind selectively to the phosphorus and are weakened, the obtained aluminosilicate catalyst is able to suppress coke formation, for example in the production of monocyclic aromatic hydrocarbons described below.

Consequently, by using the method for producing an aluminosilicate catalyst according to the present embodiment, coke formation can be suppressed in various reactions that utilize the acid sites of the crystalline aluminosilicate, such as the production of monocyclic aromatic hydrocarbons, and an aluminosilicate catalyst for which deterioration in the catalytic activity can be suppressed can be produced favorably.

Furthermore, in the mixing and firing step, because the phosphorus-treated aluminosilicate and the binder are mixed (kneaded) and molded, and the resulting molded body is then fired, the thus obtained aluminosilicate catalyst has good mechanical strength, and can therefore be used favorably in fixed beds or the like for performing the type of cracking and reforming reaction described below.

Further, by using a material containing a medium pore zeolite and/or a large pore zeolite, or a pentasil zeolite or MFI zeolite, as the crystalline aluminosilicate, an aluminosilicate catalyst of higher activity can be obtained.

Further, if a material containing alumina is used as the binder, then because alumina exhibits excellent binder performance, and can therefore be added in a smaller amount, the catalytic performance of the thus obtained aluminosilicate catalyst can be improved.

Furthermore, in those cases where a material containing alumina is used as the binder, by using phosphoric acid as the second phosphorus compound, the phosphoric acid can be adhered selectively to the alumina binder, meaning the acid sites of the aluminosilicate can be left as is, while the acid sites of the binder are selectively weakened. Accordingly, coke formation and accumulation in the obtained aluminosilicate catalyst can be suppressed.

Further, an aluminosilicate catalyst according to an embodiment of the present invention, obtained by using this type of method for producing an aluminosilicate catalyst, can suppress coke formation in various reactions that utilize the acid sites of the crystalline aluminosilicate.

[Method for Producing Monocyclic Aromatic Hydrocarbons Having a Carbon Number of 6 to 8]

Figure 1:
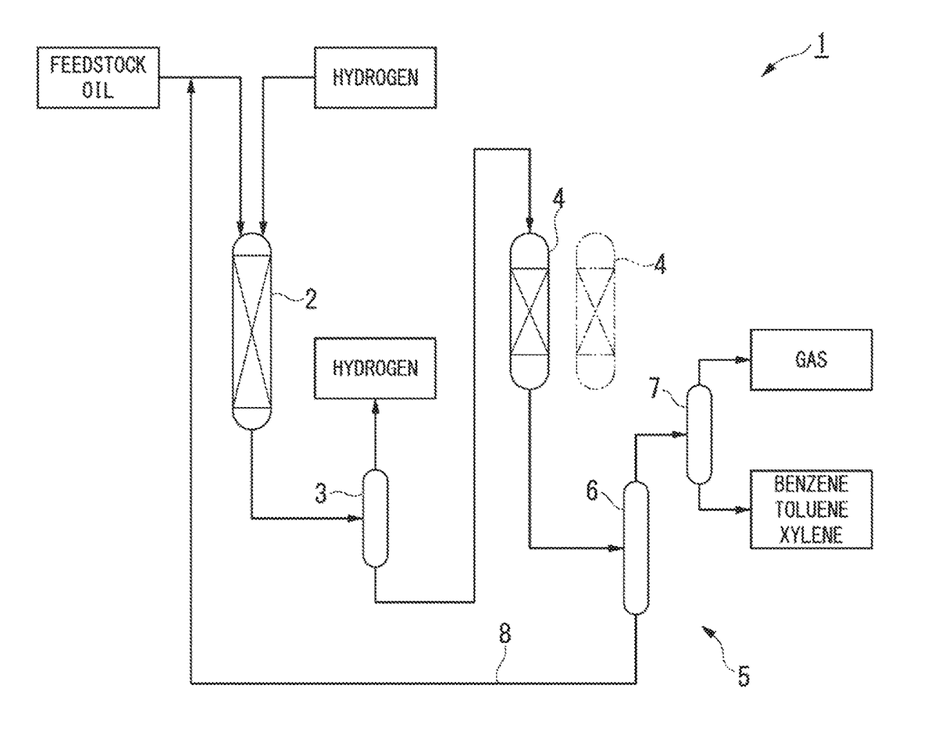
FIG. 1 is a diagram illustrating one example of a production apparatus used for implementing a method for producing monocyclic aromatic hydrocarbons having a carbon number of 6 to 8 according to an embodiment of the present invention.

Next is a description of a method for producing monocyclic aromatic hydrocarbons having a carbon number of 6 to 8, which uses an aluminosilicate catalyst according to an embodiment of the present invention, obtained using the aforementioned method for producing an aluminosilicate catalyst, as the monocyclic aromatic hydrocarbon production catalyst. FIG. 1 is a diagram illustrating one example of a production apparatus used for implementing the method for producing monocyclic aromatic hydrocarbons having a carbon number of 6 to 8 according to an embodiment of the present invention. The production apparatus 1 illustrated in FIG. 1 is used for producing monocyclic aromatic hydrocarbons having a carbon number of 6 to 8 (a BTX fraction) from a feedstock oil.

(Feedstock Oil)

The feedstock oil used in the present embodiment is an oil having a 10 vol % distillation temperature of at least 140° C. and a 90 vol % distillation temperature of not more than 390° C. With oils having a 10 vol % distillation temperature of less than 140° C., the targeted monocyclic aromatic hydrocarbons tend to decompose, resulting in a decrease in productivity. Further, when an oil having a 90 vol % distillation temperature exceeding 390° C. is used, then not only does the yield of the monocyclic aromatic hydrocarbons decrease, but the amount of coke accumulation on the monocyclic aromatic hydrocarbon production catalyst tends to increase, which may cause a rapid deterioration in the catalytic activity. The 10 vol % distillation temperature of the feedstock oil is preferably 150° C. or higher, and the 90 vol % distillation temperature of the feedstock oil is preferably not more than 360° C. In this description, the 10 vol % distillation temperature and the 90 vol % distillation temperature refer to values measured in accordance with JIS K 2254 "Petroleum Products—Determination of Distillation Characteristics".

Examples of feedstock oils having a 10 volume % distillation temperature of at least 140° C. and a 90 volume % distillation temperature of not more than 390° C. include light cycle oils (LCO) produced in fluid catalytic crackers, hydrotreated LCO, coal liquefaction oil, hydrocracked oil from heavy oils, straight-run kerosene, straight-run gas oil, coker kerosene, coker gas oil, hydrocracked oil from oil sands, thermally cracked heavy oil obtained from ethylene production apparatus, hydrogenated products of thermally cracked heavy oil obtained from ethylene production apparatus, heavy catalytic cracking gasoline (HCCG) obtained from fluid catalytic crackers, and heavy oils (PLAT-BTM) obtained from catalytic reformers.

A light cycle oil (LCO) produced in a fluid catalytic cracker or the like contains large amounts of aromatic hydrocarbons. A thermally cracked heavy oil obtained from an ethylene production apparatus is a heavier fraction than the BTX fraction obtained from the ethylene production apparatus, and contains a large amount of aromatic hydrocarbons. When a fraction is used in which the aromatic hydrocarbons include a large amount of polycyclic aromatics, because these polycyclic aromatics can cause coke formation in the subsequent cracking and reforming reaction, the fraction is preferably subjected to hydrotreating. However, if a fraction derived from an aforementioned thermally cracked heavy oil or LCO contains a large amount of monocyclic aromatic hydrocarbons, then hydrotreating may not necessarily be needed.

Similarly for other feedstock oils, the feedstock oil is preferably selected using the same basic reasoning outlined above, and feedstock oils which are likely to produce an excessive amount of coke in the cracking and reforming reaction are preferably avoided. Heavy catalytic cracking gasoline obtained from fluid catalytic crackers and heavy oils obtained from catalytic reformers are fractions which contain minimal amounts of polycyclic aromatics in the feedstock oil, and therefore hydrotreating need not be performed.

Polycyclic aromatic hydrocarbons exhibit low reactivity and are difficult to convert to monocyclic aromatic hydrocarbons in the cracking and reforming reaction of the present embodiment. However, on the other hand, if these polycyclic aromatic hydrocarbons are hydrogenated in a hydrogenation reaction and converted to naphthenobenzenes, and these naphthenobenzenes are then supplied to the cracking and reforming reaction, they can be converted to monocyclic aromatic hydrocarbons. However, among polycyclic aromatic hydrocarbons, tricyclic and higher aromatic hydrocarbons consume a large amount of hydrogen in the hydrogenation reaction step, and suffer from poor reactivity in the cracking and reforming reaction step even following conversion to hydrogenation reaction products, and therefore the feedstock oil preferably does not contain a large amount of such tricyclic and higher aromatic hydrocarbons. Accordingly, the amount of tricyclic and higher aromatic hydrocarbons within the feedstock oil is preferably not more than 25 vol %, and more preferably 15 vol % or less.

In this description, the polycyclic aromatic fraction describes the combined total of the amount of bicyclic aromatic hydrocarbons (the bicyclic aromatic fraction) and the amount of tricyclic and higher aromatic hydrocarbons (the tricyclic and higher aromatic fraction), which is either measured in accordance with JPI-5S-49 "Petroleum Products—Determination of Hydrocarbon Types—High Performance Liquid Chromatography", or determined by analysis using FID gas chromatography or two-dimensional gas chromatography. In the following description, an amount of polycyclic aromatic hydrocarbons, bicyclic aromatic hydrocarbons or tricyclic or higher aromatic hydrocarbons reported using the units vol % represents an amount that has been measured in accordance with JPI-5S-49, whereas an amount that is reported using the units mass % represents an amount that has been measured on the basis of FID gas chromatography or two-dimensional gas chromatography.

(Hydrotreatment of Feedstock Oil)

In those cases where the feedstock oil is subjected to a preliminary hydrotreatment, the hydrogenation reaction is preferably performed in accordance with the following guidelines. In the hydrogenation reaction, the hydrogenation feedstock oil is not subjected to complete hydrogenation, but rather a partial hydrogenation. In other words, in the main, the bicyclic aromatic hydrocarbons within the feedstock oil are hydrogenated selectively, and converted to monocyclic aromatic hydrocarbons in which only one of the aromatic rings has been hydrogenated (such as naphthenobenzenes). Examples of these monocyclic aromatic hydrocarbons include indane, tetralin and alkylbenzenes.

If a partial hydrotreatment is performed in this manner, then the amount of hydrogen consumed in the hydrogenation reaction process can be suppressed, and the amount of heat generated during the treatment can also be suppressed. For example, when naphthalene, which is a representative bicyclic aromatic hydrocarbon, is hydrogenated to form decalin, the amount of hydrogen consumed is 5 mol per 1 mol of naphthalene, whereas hydrogenation to form tetralin can be achieved with 2 mol of hydrogen consumption. Further, the feedstock oil (thermally cracked heavy oil) includes a large fraction containing indenes, and the amount of hydrogen consumption required to hydrogenate this fraction to indenes is even less than the amount of hydrogen required to hydrogenate naphthalene to decalin. Accordingly, the bicyclic aromatic hydrocarbons in the feedstock oil can be converted more efficiently to naphthenobenzenes.

The hydrogen used in the hydrogenation reaction may utilize the hydrogen produced in the cracking and reforming reaction described below.

A conventional hydrogenation reactor can be used as the hydrogenation reaction device 2 for performing this type of hydrotreatment. In this hydrogenation reaction, the hydrogen partial pressure at the reactor inlet is preferably from 1 to 9 MPa. The lower limit is preferably at least 1.2 MPa, and more preferably 1.5 MPa or higher. Further, the upper limit is preferably not more than 7 MPa, and more preferably 5 MPa or lower. If the hydrogen partial pressure is less than 1 MPa, then coke formation on the catalyst becomes more severe, shortening the lifespan of the catalyst. In contrast, if the hydrogen partial pressure exceeds 9 MPa, then complete hydrogenation, such as the case where both rings of a bicyclic aromatic hydrocarbon are hydrogenated, tends to increase, which causes a dramatic increase in the amount of hydrogen consumed, reduces the yield of monocyclic aromatic hydrocarbons, and increases the construction costs for the hydrogenation reactor and peripheral equipment, making economic viability a concern.

Further, the liquid hourly space velocity (LHSV) for the hydrogenation reaction in the hydrogenation reaction device 2 is preferably within a range from 0.05 to 10 $h^{-1}$. The lower limit is preferably at least 0.1 $h^{-1}$, and more preferably 0.2 $h^{-1}$ or higher. Further, the upper limit is preferably not more than 5 $h^{-1}$, and more preferably 3 $h^{-1}$ or lower. If the LHSV is less than 0.05 $h^{-1}$, the construction costs for the reactor become excessive, and economic viability becomes a concern. In contrast, if the LHSV exceeds 10 $h^{-1}$, then the hydrotreatment of the feedstock oil may not proceed sufficiently, meaning the targeted hydrogenation products may be unobtainable.

The reaction temperature of the hydrogenation reaction performed in the hydrogenation reaction device 2 (the hydrogenation temperature) is preferably from 150° C. to 400° C. The lower limit is more preferably at least 170° C., and still more preferably 190° C. or higher. Further, the upper limit is more preferably not more than 380° C., and still more preferably 370° C. or lower. If the reaction temperature falls below 150° C., then satisfactory hydrotreatment of the feedstock oil tends to be unachievable. On the other hand, if the reaction temperature exceeds 400° C., then the gas fraction by-product tends to increase, meaning the yield of the hydrotreated oil decreases, which is also undesirable.

The hydrogen/oil ratio during the hydrogenation reaction in the hydrogenation reaction device 2 is preferably from 100 to 2,000 NL/L. The lower limit is more preferably at least 110 NL/L, and still more preferably 120 NL/L or higher. Further, the upper limit is more preferably not more than 1,800 NL/L, and still more preferably 1,500 NL/L or lower. If the hydrogen/oil ratio is less than 100 NL/L, then coke formation tends to occur on the catalyst at the reactor outlet, thus shortening the catalyst lifespan. In contrast, if the hydrogen/oil ratio exceeds 2,000 NL/L, then the construction costs for the recycle compressor become excessive, making economic viability a concern.

There are no particular limitations on the reaction system used for the hydrotreatment in the hydrogenation reaction device 2, and the system can usually be selected from among various processes such as fixed bed and moving bed systems. Among these, fixed bed systems are preferred for reasons including inexpensive construction costs and operating costs. Further, the hydrogenation reaction device 2 is preferably a tower-like device.

There are no particular limitations on the hydrotreating catalyst used in the hydrotreatment, provided the catalyst is capable of selectively hydrogenating the bicyclic aromatic hydrocarbons in the feedstock oil to achieve conversion to monocyclic aromatic hydrocarbons in which only one of the aromatic rings has been hydrogenated (namely, naphthenobenzenes). Examples of preferred hydrotreating catalysts include those containing at least one metal selected from among metals belonging to group 6 of the periodic table of elements, and at least one metal selected from among metals belonging to groups 8 to 10 of the periodic table of elements. The metal belonging to group 6 of the periodic table of elements is preferably molybdenum, tungsten or chromium, and is more preferably molybdenum or tungsten. The metal belonging to groups 8 to 10 of the periodic table of elements is preferably iron, cobalt or nickel, and is more preferably cobalt or nickel. These metals may be used individually, or combinations of two or more metals may be used. Specific examples of metal combinations that can be used favorably include molybdenum-cobalt, molybdenum-nickel, tungsten-nickel, molybdenum-cobalt-nickel, and tungsten-cobalt-nickel. The periodic table of elements mentioned here refers to the long period-type periodic table of elements prescribed by the International Union of Pure and Applied Chemistry (IUPAC).

The hydrotreating catalyst is preferably a catalyst in which the metal described above is supported on an inorganic carrier containing aluminum oxide. Preferred examples of the inorganic carrier containing aluminum oxide include alumina, alumina-silica, alumina-boria, alumina-titania, alumina-zirconia, alumina-magnesia, alumina-silica-zirconia, alumina-silica-titania, and carriers prepared by adding alumina to a porous inorganic compound including the various zeolites and any of the various clay minerals such as sepiolite and montmorillonite. Among these various possibilities, alumina is particularly preferred.

The hydrotreating catalyst is preferably obtained by supporting, on an inorganic carrier containing aluminum oxide, 10 to 30 mass % of at least one metal selected from among metals belonging to group 6 of the periodic table of elements, and 1 to 7 mass % of at least one metal selected from among metals belonging to groups 8 to 10 of the periodic table of elements, relative to the total catalyst mass composed of the combined mass of the inorganic carrier and the metals. If either the mass of the metal belonging to group 6 of the periodic table of elements or the mass of the metal belonging to groups 8 to 10 of the periodic table of elements is less than the respective lower limit mentioned above, then the catalyst tends to lack adequate hydrotreating activity, whereas if either amount exceeds the respective upper limit, then not only does the cost of the catalyst increase, but aggregation or the like of the supported metals becomes more likely, meaning the catalyst tends not to exhibit adequate hydrotreating activity.

Although there are no particular limitations on the metal precursors that are used in supporting the aforementioned metals on the inorganic carrier, inorganic salts or organometallic compounds of the metals are typically used, and water-soluble inorganic salts can be used particularly favorably. In the supporting step, a solution, and preferably an aqueous solution, of the metal precursors is used to support the metals. The supporting operation preferably utilizes a conventional method such as a dipping method, impregnation method or coprecipitation method.

The carrier with the metal precursors supported thereon is dried, and is then preferably fired in the presence of oxygen to initially convert the metals to oxides. Then, prior to hydrotreating the feedstock oil, a sulfidization treatment known as presulfiding is preferably performed to convert the metals to sulfides.

Although there are no particular limitations on the conditions for the presulfiding treatment, it is preferable that a sulfur compound is added to the petroleum fraction or thermally cracked heavy oil (hereafter referred to as the presulfiding feedstock oil), and the resulting mixture is then brought into continuous contact with the hydrotreating catalyst under conditions including a temperature of 200 to 380° C., an LHSV value of 1 to 2 $h^{-1}$, a pressure equal to that used during the hydrotreatment operation, and a treatment time of at least 48 hours. Although there are no particular limitations on the sulfur compound added to the presulfiding feedstock oil, dimethyl disulfide (DMDS), sulfazole, or hydrogen sulfide or the like is preferred, and these compounds are preferably added to the presulfiding feedstock oil in an amount of about 1 mass % relative to the mass of the presulfiding feedstock oil.

As illustrated in FIG. 1, the hydrotreated oil (partial hydrogenation product) obtained from the hydrogenation reaction device 2 (hydrogenation reaction) is fed into a subsequent dehydrogenation tower 3 in which hydrogen is removed from the oil, and is then supplied to a cracking and reforming reaction device 4 to undergo the cracking and reforming reaction. Further, a fraction containing mainly hydrocarbons with a carbon number of about 9 to 10 and containing minimal polycyclic aromatics and therefore not requiring hydrogenation may be supplied directly to the cracking and reforming reaction device 4 together with the hydrotreated oil.

[Cracking and Reforming Reaction]

The cracking and reforming reaction device 4 contains a monocyclic aromatic hydrocarbon production catalyst, and the supplied feedstock oil (hydrogenated oil) contacts this catalyst and undergoes reaction, yielding a product containing monocyclic aromatic hydrocarbons having a carbon number of 6 to 8.

(Monocyclic Aromatic Hydrocarbon Production Catalyst)

In the present embodiment, the aluminosilicate catalyst described above, namely the aluminosilicate catalyst obtained using the method for producing an aluminosilicate catalyst according to an embodiment of the present invention, is used as the monocyclic aromatic hydrocarbon production catalyst.

(Reaction System)

In the present embodiment, a fixed bed system is used as the reaction system for the cracking and reforming reaction device 4, namely the reaction system used for bringing the feedstock oil (hydrogenated oil) into contact with the monocyclic aromatic hydrocarbon production catalyst within the cracking and reforming reaction device 4, and inducing the cracking and reforming reaction.

Compared with fluidized beds and moving beds, the equipment costs for fixed bed systems are significantly cheaper. In other words, the construction costs and operating costs for fixed beds are significantly cheaper than those for fluidized beds or moving beds. In the present embodiment, as illustrated in FIG. 1, a fixed bed cracking and reforming reaction device 4 (fixed bed reactor 4) is used, and two of these fixed bed reactors 4 are used. Although reaction and regeneration can be repeated using a single fixed bed reactor, in order to enable the reaction to be performed continuously, it is preferable to install two or more reactors, and alternately repeat reaction and regeneration for these reactors.

Two fixed bed reactors 4 are illustrated in FIG. 1, but the invention is not limited to this configuration, and three or more reactors may also be installed. In other words, in a fixed bed cracking and reforming reaction device, as the cracking and reforming reaction proceeds, coke adheres in particular to the catalyst surface, and the activity of the catalyst deteriorates. When the activity deteriorates in this manner, the yield of the monocyclic aromatic hydrocarbons having a carbon number of 6 to 8 (the BTX fraction) decreases. As a result, the catalyst must be subjected to a regeneration treatment.

Accordingly, in the fixed bed cracking and reforming reaction device 4 (fixed bed reactor), once the device has been operated for a prescribed period that has been set in advance, the catalyst for which the activity has deteriorated as a result of coke adhesion is subjected to a regeneration treatment. In other words, two or more cracking and reforming reaction devices 4 (fixed bed reactors) are used, and the cracking and reforming reaction, and the regeneration of the monocyclic aromatic hydrocarbon production catalyst are repeated, while the reaction devices are exchanged on a regular basis.

The operation time for which a single cracking and reforming reaction device 4 can be operated continuously differs depending on the size of the device and the various operating conditions (reaction conditions), but is typically from several hours to about 10 days. If the number of reactors within the cracking and reforming reaction device 4 (the number of fixed bed reactors) is increased, then the continuous operating time for each reactor can be shortened, and the degree of deterioration in the catalytic activity can be suppressed, meaning the time required for regeneration can also be shortened.

In the present embodiment, the aluminosilicate catalyst described above is used as the monocyclic aromatic hydrocarbon production catalyst, and this aluminosilicate catalyst suppresses coke formation, thus suppressing any deterioration in the catalytic activity. Accordingly, compared with the case where a conventional monocyclic aromatic hydrocarbon production catalyst is used, the present embodiment is able to suppress any decrease in the BTX production efficiency (conversion efficiency) caused by coke formation during continuous operation of a single cracking and reforming reaction device 4. In other words, when the continuous operating time in a single cracking and reforming reaction device 4 is set to the same level as a conventional device, the BTX production efficiency can be improved compared with the conventional device. Further, if the BTX production efficiency in a single continuous operation were to be set to the same level as a conventional device, then the single continuous operation can be lengthened compared with the conventional device. Accordingly, by lengthening the "reaction→regeneration" cycle, the costs and the like required for the regeneration of the monocyclic aromatic hydrocarbon production catalyst can be reduced, thereby significantly reducing the operating costs compared with conventional devices.

(Reaction Temperature)

Although there are no particular limitations on the reaction temperature during contact and reaction of the feedstock oil with the catalyst, the temperature is preferably from 350° C. to 700° C., and more preferably from 400° C. to 650° C. If the reaction temperature is less than 350° C., the reaction activity is unsatisfactory. If the reaction temperature exceeds 700° C., then the reaction becomes unfavorable from an energy perspective, and coke formation increases dramatically, resulting in a decrease in the production efficiency for the target product.

(Reaction Pressure)

The reaction pressure during contact and reaction of the feedstock oil with the catalyst is typically from 0.1 MPaG to 2.0 MPaG. In other words, contact between the feedstock oil and the monocyclic aromatic hydrocarbon production catalyst is performed at a pressure of 0.1 MPaG to 2.0 MPaG.

In the present embodiment, because the reaction concept is completely different from a conventional hydrocracking method, the types of high-pressure conditions deemed advantageous in hydrocracking are completely unnecessary. In contrast, a higher pressure than necessary accelerates the cracking process, resulting in the production of untargeted light gas by-products, and is therefore undesirable. Further, the fact that high-pressure conditions are not required is also advantageous in terms of design of the reaction device. In other words, provided the reaction pressure is from 0.1 MPaG to 2.0 MPaG, the hydrogen transfer reaction can be performed efficiently.

(Contact Time)

There are no particular limitations on the contact time between the feedstock oil and the catalyst, provided the actual reaction proceeds as desired, but the gas transit time across the catalyst is preferably from 2 to 150 seconds, more preferably from 3 to 100 seconds, and still more preferably from 5 to 80 seconds. If the contact time is less than 2 seconds, then achieving any substantial reaction is difficult. If the contact time exceeds 150 seconds, then deposition of carbon matter on the catalyst due to coking or the like tends to increase, or the amount of light gas generated by cracking increases, and the device also tends to increase in size, all of which are undesirable.

(Regeneration Treatment)

Once the cracking and reforming reaction has been performed for a prescribed time in the cracking and reforming reaction device 4, the operation of the cracking and reforming reaction is switched to a separate cracking and reforming reaction device 4, and in the cracking and reforming reaction device 4 in which operation of the cracking and reforming reaction has been halted, the monocyclic aromatic hydrocarbon production catalyst for which the activity has deteriorated is subjected to regeneration.

The deterioration in catalytic activity is mainly due to coke adhesion to the catalyst surface, and therefore a treatment for removing the coke from the catalyst surface is performed as a regeneration treatment. Specifically, air is passed through the cracking and reforming reaction device 4, and the coke adhered to the catalyst surface is combusted. Because the cracking and reforming reaction device 4 is maintained at a satisfactorily high temperature, simply passing air through the device is sufficient to easily combust the coke adhered to the catalyst surface. However, if normal air is supplied to and passed through the cracking and reforming reaction device 4, then there is a possibility that sudden combustion may occur. Accordingly, air that has been premixed with nitrogen to lower the oxygen concentration is preferably supplied to and passed through the cracking and reforming reaction device 4. In other words, the air used in the regeneration treatment has preferably had the oxygen concentration reduced to a value from several % to about 10%. Further, there is no necessity that the reaction temperature and the regeneration temperature be the same, and a suitable temperature may be set as appropriate.

(Refining and Collection of BTX Fraction)

The cracking and reforming reaction product discharged from the cracking and reforming reaction device 4 includes a gas containing olefins having a carbon number of 2 to 4, a BTX fraction containing benzene, toluene and xylene, and aromatic hydrocarbons of C9 or higher. Accordingly, a refining and collection device 5 provided downstream from the cracking and reforming reaction device 4 separates the cracking and reforming reaction product into each of these components, and refines and collects each component.

The refining and collection device 5 has a BTX fraction collection tower 6 and a gas separation tower 7.

The BTX fraction collection tower 6 distills the aforementioned cracking and reforming reaction product, and separates the product into a light fraction having a carbon number of 8 or less, and a heavy fraction having a carbon number of 9 or higher. The gas separation tower 7 distills the light fraction having a carbon number of 8 or less separated in the BTX fraction collection tower 6, and separates the fraction into a BTX fraction containing benzene, toluene and xylene, and a gas fraction containing compounds having lower boiling points. This enables the BTX fraction composed of monocyclic aromatic hydrocarbons with a carbon number of 6 to 8 to be produced with excellent efficiency.

(Recycling Treatment)

Further, the heavy fraction having a carbon number of 9 or higher (the bottom fraction) separated in the BTX fraction collection tower 6 is returned to the hydrogenation reaction device 2 via a recycling line 8, and is supplied a second time to the hydrogenation reaction step together with the kerosene and light oil fraction that functions as the feedstock oil. In other words, this heavy fraction (bottom fraction) passes through the hydrogenation reaction device 2 and is returned to the cracking and reforming reaction device 4, where it is re-supplied to the cracking and reforming reaction.

In the method for producing monocyclic aromatic hydrocarbons having a carbon number of 6 to 8 according to the present embodiment, the aluminosilicate catalyst described above is used as the monocyclic aromatic hydrocarbon production catalyst, and because this aluminosilicate catalyst suppresses coke formation and is resistant to any deterioration in activity, the BTX production efficiency can be improved compared with the case where a conventional monocyclic aromatic hydrocarbon production catalyst is used. Alternatively, the "reaction→regeneration" cycle may be lengthened, enabling a significant reduction in operating costs compared with conventional devices.

Furthermore, because two or more fixed bed reactors are used for the cracking and reforming reaction device 4, and these reactors are exchanged periodically while the cracking and reforming reaction and the regeneration of the monocyclic aromatic hydrocarbon production catalyst are repeated, the BTX fraction can be produced with excellent production efficiency. Further, because fixed bed reactors are used, for which the equipment costs are significantly cheaper than fluidized bed reactors, the costs of constructing the devices used in the cracking and reforming processes can be kept satisfactorily low.

The present invention is not limited to the embodiments described above, and various modifications are possible without departing from the scope of the present invention.

For example, the above embodiments described the case in which an aluminosilicate catalyst obtained using the method for producing an aluminosilicate catalyst according to one aspect of the present invention was used as a monocyclic aromatic hydrocarbon production catalyst in a cracking and reforming reaction in a BTX production process, but as mentioned above, the aluminosilicate catalyst according to the present invention can also be used in a variety of other reactions that utilize the acid sites of the crystalline aluminosilicate besides this cracking and reforming reaction.

Specifically, the aluminosilicate catalyst can also be used in ethylene-propylene synthesis from methanol, propylene synthesis from methanol and butene, propylene synthesis from dimethyl ether, propylene synthesis via catalytic cracking of C4 to C8 paraffin, propylene synthesis via catalytic cracking of C4 to C8 olefins, gasoline synthesis from methanol, ethylene synthesis by dehydrogenation of ethane, propylene synthesis by dehydrogenation of propane, butene synthesis by dehydrogenation of butane, styrene synthesis by dehydrogenation of ethylbenzene, BTX synthesis by cyclodehydrogenation of C2 to C7 paraffin, BTX synthesis by cyclodehydrogenation of C4 to C5 olefins, xylene synthesis by methylation of toluene, catalytic dewaxing processes for producing lubricant base oils, para-xylene synthesis by isomerization of mixed xylene, para-xylene synthesis from benzene-toluene-C9 aroma by transalkylation or disproportionation, alkylation of benzene (synthesis of ethylbenzene from benzene and ethylene, synthesis of cumene from benzene and propylene), synthesis of pyridines, synthesis of cyclohexanol, dimerization of propylene or butenes, and alkylation of olefins, and in any of these cases, coke formation can be suppressed.

EXAMPLES

The present invention is described below in further detail using a series of examples and comparative examples, but the present invention is in no way limited by these examples.

[Method for Producing Hydrotreated Oil of Feedstock Oil]

(Preparation of Hydrotreating Catalyst)

Water glass No. 3 was added to 1 kg of an aqueous solution of sodium aluminate with a concentration of 5 mass %, and the resulting mixture was placed in a container held at 70° C. Further, a solution obtained by adding an aqueous solution of titanium (IV) sulfate ($TiO_2$ content: 24 mass %) to 1 kg of an aqueous solution of aluminum sulfate with a concentration of 2.5 mass % was prepared in another container held at 70° C., and this solution was then added dropwise over 15 minutes to the above aqueous solution containing sodium aluminate. The amounts of the above water glass and the titanium sulfate aqueous solution were adjusted to provide the prescribed amounts of silica and titania respectively.

The point where the pH of the mixed solution reached 6.9 to 7.5 was deemed the end point, and the thus obtained slurry-like product was then filtered through a filter to obtain a cake-like slurry. This cake-like slurry was transferred to a container fitted with a reflux condenser, 300 ml of distilled water and 3 g of a 27% aqueous solution of ammonia were added, and the mixture was stirred under heat at 70° C. for 24 hours. The stirred slurry was placed in a kneading device, and kneading was performed while heating to at least 80° C. to remove moisture, thus obtaining a clay-like kneaded product.

The thus obtained kneaded product was extruded into a cylindrical shape having a diameter of 1.5 mm using an extrusion molding apparatus, and following drying at 110° C. for one hour, was fired at 550° C. to obtain a molded carrier. Subsequently, a 300 g sample of the obtained molded carrier was impregnated by spraying with an impregnation solution prepared by adding molybdenum trioxide, cobalt (II) nitrate hexahydrate and phosphoric acid (concentration: 85%) to 150 ml of distilled water and then adding sufficient malic acid to achieve dissolution.

The amounts used of the molybdenum trioxide, the cobalt (II) nitrate hexahydrate and the phosphoric acid were adjusted to achieve the prescribed amounts of supported material. The sample impregnated with the impregnation solution was dried at 110° C. for one hour, and was then fired at 550° C. to obtain a catalyst A. Based on the mass of the carrier, the catalyst A had an $SiO_2$ content of 1.9 mass % and a $TiO_2$ content of 2.0 mass %, whereas based on the mass of the catalyst, the amount of supported $MoO_3$ was 22.9 mass %, the amount of supported CoO was 2.5 mass %, and the amount of supported $P_2O_5$ was 4.0 mass %.

(Preparation of Feedstock Oils)

A light cycle oil A obtained from an FCC apparatus was prepared. Further, a distillation operation was used to separate only the light fraction from a thermally cracked heavy oil obtained from an ethylene production apparatus, thus preparing a thermally cracked heavy oil, and this thermally cracked heavy oil was mixed with components (aromatic hydrocarbons) having a carbon number of 9 or higher separated and collected in a cracked gasoline collection unit, thus preparing a thermally cracked heavy oil B. A heavy catalytic racking gasoline C obtained from an FCC apparatus, and a heavy oil D obtained from a catalytic reformer were also prepared. The properties of each of these feedstock oils are shown in Table 1.

TABLE 1

| Property | Light cycle oil A | Thermally cracked heavy oil B | Heavy catalytic cracking gasoline C | Catalytic reformer heavy oil D |
|---|---|---|---|---|
| Density, 15° C. | 0.9328 | 0.912 | 0.835 | 0.885 |
| Kinematic viscosity, 30° C. | 3.007 | 1.074 | — | 0.9180 |
| Kinematic viscosity, 40° C. | — | 0.9457 | — | 0.8118 |
| Sulfur fraction | 0.1600% | 0.001% | 0.002% | 0.0003% |
| Distillation properties, ° C. | | | | |
| IBP | 182 | 163 | 153 | 164 |
| T10 | 213 | 171 | 165 | 166 |
| T90 | 343 | 221 | 202 | 184 |
| EP | 373 | 252 | 213 | 264 |
| Saturated fraction, % | 21 | 4 | 29 | 1 |
| Aromatic fraction, % | 76 | 95 | 64 | 64 |
| Bicyclic or higher aromatic fraction, % | 46 | 23 | 3 | 6 |

(Hydrotreating Reaction of Feedstock Oils)

A fixed bed continuous flow reaction apparatus was packed with the above catalyst A, and presulfiding of the catalyst was first performed. In other words, to a fraction equivalent to a straight-run gas oil (the presulfiding feedstock oil) having a density at 15° C. of 851.6 kg/m³, an initial boiling point of 231° C. and an end point of 376° C. in a distillation test, a sulfur content reported as a mass of sulfur atoms relative to the mass of the presulfiding feedstock oil of 1.18 mass %, and a color L of 1.5, was added 1 mass % of DMDS relative to the mass of the fraction, and the resulting mixture was supplied continuously to the catalyst A for 48 hours.

Subsequently, using the light cycle oil A and the thermally cracked heavy oil B shown in Table 1 as separate feedstock oils, hydrotreating was performed at a reaction temperature of 300° C., LHSV=1.0 h$^{-1}$, a hydrogen/oil ratio of 500 NL/L, and a pressure of 3 MPa. The properties of the thus obtained hydrogenated light cycle oil A-1 and the hydrogenated thermally cracked heavy oil B-1 are shown in Table 2.

TABLE 2

| Property | Hydrogenated light cycle oil A-1 | Hydrogenated thermally cracked heavy oil B-1 |
|---|---|---|
| Density, 15° C. | 0.9051 | 0.902 |
| Kinematic viscosity, 30° C. | 2.938 | — |
| Kinematic viscosity, 40° C. | — | 0.9478 |
| Sulfur fraction | 0.0003% | 0.0002% |
| Distillation properties, ° C. | | |
| IBP | 189 | 160 |
| T10 | 212 | 169 |
| T90 | 330 | 219 |
| EP | 368 | 251 |
| Saturated fraction, % | 34 | 7 |
| Aromatic fraction, % | 66 | 93 |
| Bicyclic or higher aromatic fraction, % | 10 | 4 |

The distillation properties shown in Tables 1 and 2 were measured in accordance with JIS K 2254 "Petroleum Products—Determination of Distillation Characteristics". Further, the density values (at 15° C.) shown in Table 1 were measured in accordance with JIS K 2254 "Petroleum Products—Determination of Distillation Characteristics", the kinematic viscosity values (at 30° C. or 40° C.) were measured in accordance with JIS K 2283 "Crude Oil and Petroleum Products—Determination of Kinematic Viscosity and Calculation of Viscosity Index from Kinematic Viscosity", and the sulfur fraction was measured in accordance with JIS K 2541 "Crude oil and Petroleum Products—Determination of Sulfur Content".

Furthermore, for each of the compositions in Tables 1 and 2, the saturated hydrocarbon fraction and the aromatic hydrocarbon fraction obtained by silica gel chromatographic separation were each subjected to mass analysis using the EI ionization method (apparatus: JMS-700, manufactured by JEOL Ltd.), and a type analysis of the hydrocarbons was performed in accordance with ASTM D2425 "Standard Test Method for Hydrocarbon Types in Middle Distillates by Mass Spectrometry".

[Method for Producing Aromatic Hydrocarbons]
(Monocyclic Aromatic Hydrocarbon Production Catalyst Preparation Example)
Preparation of Phosphorus-Treated Crystalline Aluminosilicate (MFI Zeolite)

A solution (A) composed of 1705.2 g of sodium silicate (J sodium silicate No. 3, SiO$_2$: 28 to 30 mass %, Na: 9 to 10 mass %, remainder: water, manufactured by Nippon Chemical Industrial Co., Ltd.) and 2,227.6 g of water, and a solution (B) composed of 64.3 g of Al$_2$(SO$_4$)$_3$.14-18H$_2$O (special reagent grade, manufactured by Wako Pure Chemical Industries, Ltd.), 369.2 g of tetrapropylammonium bromide, 152.1 g of H$_2$SO$_4$ (97 mass %), 326.7 g of NaCl and 2,975.7 g of water were prepared separately.

Subsequently, with the solution (A) undergoing constant stirring at room temperature, the solution (B) was added gradually to the solution (A). The resulting mixture was stirred vigorously for 15 minutes using a mixer, thereby breaking up the gel and forming a uniform fine milky mixture.

This mixture was then placed in a stainless steel autoclave, and a crystallization operation was performed under self-generated pressure, under conditions including a temperature of 165° C., a time period of 72 hours, and a stirring speed of 100 rpm. Following completion of the crystallization operation, the product was filtered, the solid product was collected, and an operation of washing the product with about 5 liters of deionized water and then filtering was repeated 5 times. The solid material obtained upon the final filtration was dried at 120° C. and then fired under a stream of air at 550° C. for 3 hours.

Analysis of the resulting fired product by X-ray diffraction (apparatus model: Rigaku RINT-2500V) confirmed that the product had an MFI structure. Further, X-ray fluorescence analysis (apparatus model: Rigaku ZSX101e) revealed an SiO$_2$/Al$_2$O$_3$ ratio (molar ratio) of 65. Based on these results, the amount of aluminum element incorporated within the lattice framework was calculated as 1.3 mass %.

Subsequently, a 30 mass % aqueous solution of ammonium nitrate was added to the fired product in a ratio of 5 mL of the aqueous solution per 1 g of the obtained fired product, and after heating at 100° C. with constant stirring for 2 hours, the mixture was filtered and washed with water. This operation was repeated 4 times, and the product was then dried at 120° C. for 3 hours, yielding an ammonium-type MFI zeolite. Subsequently, the product was fired at 780° C. for 3 hours, yielding a proton-type MFI zeolite.

Next, in the first phosphorus treatment step, 30 g of the obtained proton-type MFI zeolite was impregnated with 30 g of an aqueous solution of diammonium hydrogen phosphate in order to support 1.5 mass % of phosphorus (based on a value of 100 mass % for the total mass of the proton-type MFI zeolite), and the resulting product was then dried at 120° C. Subsequently, the product was fired under a stream of air at 780° C. for 3 hours, yielding a phosphorus-treated crystalline aluminosilicate A.

Preparation of Aluminosilicate (MFI Zeolite) Catalyst

An appropriate amount of pure water was added to the obtained phosphorus-treated crystalline aluminosilicate A and an alumina powder (Cataloid AP-1, manufactured by JGC C&C, Ltd., Al$_2$O$_3$ content: 71.7 wt %), and the resulting mixture was kneaded to form a lumpy phosphorus-treated crystalline aluminosilicate/alumina mixture. This mixture was processed into a circular cylindrical shape (diameter: 1.8 mm) using an extrusion molding apparatus, and the extruded product was dried at 120° C. and then fired under a stream of air at 550° C. for 3 hours. Then, in a second phosphorus treatment step, the product was impregnated with 30 g of an aqueous solution of phosphoric acid in order to support 1.5 mass % of phosphorus (based on a value of 100 mass % for the total mass of the phosphorus-treated crystalline aluminosilicate/alumina mixture), and the resulting product was dried at 120° C. Subsequently, the product was fired under a stream of air at 780° C. for 3 hours, yielding an aluminosilicate (MFI zeolite) catalyst B. In this aluminosilicate catalyst, the weight ratio of phosphors-treated crystalline aluminosilicate/alumina was 90 mass %/10 mass %.

Using the same preparation method as that described above for the aluminosilicate catalyst B, a variety of catalysts B, C, D, E, E, F, G and H shown in Table 3 were prepared by appropriate combinations of the amounts added of the various components in the first phosphorus treatment step and the second phosphorus treatment step.

Preparation of Phosphorus-Treated Crystalline Aluminosilicate (BEA Zeolite)

A first solution was prepared by dissolving 59.0 g of silicic acid (SiO$_2$: 89 mass %) in 202 g of an aqueous solution of tetraethylammonium hydroxide (40 mass %). This first solution was added to a second solution prepared by dissolving 0.74 g of Al pellets and 2.69 g of sodium hydroxide in 17.7 g of water. By mixing the first solution and the second solution in this manner, a reaction mixture with a composition (calculated as a molar ratio of oxides) of 2.4Na$_2$O-20.0(TEA)$_2$-Al$_2$O$_3$-64.0SiO$_2$-612H$_2$O was obtained.

This reaction mixture was placed in a 0.3 L autoclave and heated at 150° C. for 6 days. The thus obtained product was separated from the mother liquor and washed in distilled water.

Based on the results of analysis of the thus obtained product by X-ray diffraction (apparatus model: Rigaku RINT-2500V), the XRD pattern confirmed that the product was a BEA zeolite.

Subsequently, following an ion exchange with an aqueous solution of ammonium nitrate (30 mass %), the BEA zeolite was fired at 550° C. for 3 hours, yielding a proton-type BEA zeolite.

Next, in the first phosphorus treatment step, 30 g of the proton-type BEA zeolite was impregnated with 30 g of an aqueous solution of diammonium hydrogen phosphate in order to support 2.0 mass % of phosphorus (based on a value of 100 mass % for the total mass of the crystalline aluminosilicate), and the resulting product was then dried at 120° C. Subsequently, the product was fired under a stream of air at 780° C. for 3 hours, yielding a phosphorus-treated crystalline aluminosilicate (BEA zeolite).

Preparation of Aluminosilicate (Containing MFI and BEA Zeolites)

A phosphorus-treated crystalline aluminosilicate (containing MFI and BEA zeolites) obtained by mixing 1 part by mass of the aforementioned phosphorus-treated crystalline aluminosilicate (BEA zeolite) and 9 parts by mass of the aforementioned phosphorus-treated crystalline aluminosilicate B (MFI zeolite) and an alumina powder (Cataloid AP-1, manufactured by JGC C&C, Ltd., $Al_2O_3$ content: 71.7 wt %) were kneaded together while an appropriate amount of pure water was added, thus forming a lumpy phosphorus-treated crystalline aluminosilicate/alumina mixture. This mixture was processed into a circular cylindrical shape (diameter: 1.8 mm) using an extrusion molding apparatus, and the extruded product was dried at 120° C. and then fired under a stream of air at 550° C. for 3 hours. Then, in a second phosphorus treatment step, the product was impregnated with 30 g of an aqueous solution of phosphoric acid in order to support 1.5 mass % of phosphorus (based on a value of 100 mass % for the total mass of the phosphorus-treated crystalline aluminosilicate/alumina mixture), and the resulting product was dried at 120° C. Subsequently, the product was fired under a stream of air at 780° C. for 3 hours, yielding an aluminosilicate catalyst I (containing both MFI zeolite and BEA zeolites). In this aluminosilicate catalyst, the weight ratio of phosphorus-treated crystalline aluminosilicate/alumina was 90 mass %/10 mass %.

(Heat Treatment Using Water Vapor of Monocyclic Aromatic Hydrocarbon Production Catalyst)

Using the catalyst B and the catalyst D described above, treatment of each catalyst was performed in an atmosphere with a water vapor concentration of 100% and a heating temperature of 700° C. for a treatment time of 15 minutes, thus preparing a hydrothermally treated catalyst B-1 and a hydrothermally treated catalyst D-1 shown in Table 3.

TABLE 3

| | Catalysts | | | | | | | | | |
|---|---|---|---|---|---|---|---|---|---|---|
| Catalyst name | B | C | D | E | F | G | H | I | B-1 | D-1 |
| Amount of phosphorus added in first phosphorus treatment step | 1.5% | 1.0% | 3.0% | 1.5% | 1.5% | 1.5% | 0% | 2.0% | 1.5% | 3.0% |
| Amount of phosphorus added in second phosphorus treatment step | 1.5% | 1.5% | 1.0% | 1.0% | 2.5% | 0.0% | 1.0% | 1.5% | 1.5% | 1.0% |
| Hydrothermal treatment step | no | no | no | no | no | no | no | no | yes | yes |

The catalytic activity of each of the obtained catalysts in the initial reaction stage, and the catalytic activity after hydrothermal degradation were evaluated in the following manner.

[Initial Reaction Stage of Production of Monocyclic Aromatic Hydrocarbons Having a Carbon Number of 6 to 8]

Using a flow-type reaction apparatus in which the reactor had been packed with one of the above catalysts (10 ml), the hydrogenated light cycle oil A-1 or the hydrogenated thermally cracked heavy oil B-1 was introduced into the reactor and brought into contact with the catalyst and reacted under conditions including a reaction temperature of 550° C., a reaction pressure of 0.1 MPaG, and a contact time between the feedstock and the catalyst of 25 seconds. As illustrated in Table 4, the various combinations of the different feedstock oils and catalysts were deemed Examples 1 to 8 and Comparative Examples 1 and 2.

TABLE 4

| | (Reaction Results) | | | | | |
|---|---|---|---|---|---|---|
| | Example 1 | Example 2 | Example 3 | Example 4 | Example 5 | Example 6 |
| Feedstock | hydrogenated light cycle oil A-1 | hydrogenated thermally cracked heavy oil B-1 | hydrogenated thermally cracked heavy oil B-1 | hydrogenated light cycle oil A-1 | hydrogenated thermally cracked heavy oil B-1 | hydrogenated thermally cracked heavy oil B-1 |
| Catalyst | B | C | D | E | F | I |

TABLE 4-continued (Reaction Results)

| Catalyst state | initial | initial | initial | initial | initial | initial |
|---|---|---|---|---|---|---|
| BTX yield | 31% | 40% | 38% | 29% | 40% | 41% |

| | Example 7 | Example 8 | Example 9 | Example 10 | Comparative Example 1 | Comparative Example 2 |
|---|---|---|---|---|---|---|
| Feedstock | hydrogenated thermally cracked heavy oil B-1 | hydrogenated light cycle oil A-1 | heavy catalytic racking gasoline C | catalytic reformed heavy oil D | hydrogenated thermally cracked heavy oil B-1 | hydrogenated light cycle oil A-1 |
| Catalyst | D-1 | B-1 | B-1 | B-1 | G | H |
| Catalyst state | initial | initial | initial | initial | initial | initial |
| BTX yield | 39% | 32% | 40% | 50% | 32% | 22% |

Reaction was continued for 24 hours under the conditions shown in Table 4 to produce monocyclic aromatic hydrocarbons having a carbon number of 6 to 8 (benzene, toluene, xylene). The total mass of the thus obtained product was collected, and a compositional analysis of the product was performed using an FID gas chromatograph to evaluate the catalytic activity (recorded as initial reaction stage). The results of evaluating the average BTX yield (benzene, toluene, xylene) when reaction was performed for 24 hours are shown in Table 4.

Based on the results shown in Table 4, it was evident that in Example 1 to Example 6, in which reaction was performed using a catalyst that had been treated in the first and second phosphorus treatment steps, monocyclic aromatic hydrocarbons having a carbon number of 6 to 8 (benzene, toluene, xylene) were able to be produced with better efficiency than in Comparative Example 1 or Comparative Example 2 (comparative examples using the same feedstocks) in which reaction was performed using a catalyst that had not undergone treatment in either the first or second phosphorus treatment step.

Accordingly, by performing an appropriate level of phosphorus treatment in the first and second phosphorus treatment steps, degradation of the crystalline aluminosilicate and the alumina binder due to significant coke formation and adhesion (accumulation) was able to be suppressed.

Further, it was also evident that in Example 7 and Example 8, in which the hydrothermally treated catalysts B-1 and D-1 were used, monocyclic aromatic hydrocarbons having a carbon number of 6 to 8 (benzene, toluene, xylene) were able to be produced with better efficiency than in Example 1 and Example 3, in which the catalysts B and D that had not been hydrothermally treated were used. This confirmed that by using a catalyst that had undergone an appropriate level of hydrothermal treatment in advance, BTX was able to be produced with even better efficiency.

Furthermore, it was also evident that in Examples 9 and 10, which used different feedstocks from Examples 1 to 8, monocyclic aromatic hydrocarbons having a carbon number of 6 to 8 (benzene, toluene, xylene) were still able to be produced with good efficiency.

Accordingly, it was confirmed that in Examples 1 to 10, by using an aluminosilicate catalyst that had been treated in the first and second phosphorus treatment steps, BTX was able to be produced with good efficiency.

Among the above catalysts, the catalyst B, the catalyst B-1 and the catalyst H were each subjected to simulated hydrothermal degradation by performing a hydrothermal treatment under a 100 mass % water vapor atmosphere at a treatment temperature of 650° C. for a treatment time of 6 hours. This state following simulated hydrothermal degradation was described as "after hydrothermal degradation", and using the same method as that described above in [Initial Reaction Stage of Production of Monocyclic Aromatic Hydrocarbons Having a Carbon Number of 6 to 8], each catalyst was reacted with a feedstock oil, and the resulting product was subjected to compositional analysis to evaluate the catalytic activity after hydrothermal degradation. The evaluation results are shown in Table 5.

TABLE 5

(Reaction Results)

| | Example 11 | | Example 12 | | Comparative Example 3 | |
|---|---|---|---|---|---|---|
| Feedstock | Hydrogenated thermally cracked heavy oil B-1 | | Hydrogenated thermally cracked heavy oil B-1 | | Hydrogenated thermally cracked heavy oil B-1 | |
| Catalyst | B | | B-1 | | H | |
| Catalyst state | initial | after hydrothermal degradation | initial | after hydrothermal degradation | initial | after hydrothermal degradation |
| BTX yield | 41% | 39% | 42% | 40% | 33% | 25% |

As illustrated in Table 5, it was evident that compared with Comparative Example 3, which used a catalyst that had not undergone treatment in either the first or the second phosphorus treatment step, Example 11 and Example 12, in which reaction was performed using an aluminosilicate catalyst that had been subjected to both the first and second phosphorus treatment steps, exhibited a smaller reduction in the BTX yield between the initial state and the state after hydrothermal degradation, and monocyclic aromatic hydrocarbons having a carbon number of 6 to 8 (benzene, toluene, xylene) were still able to be produced with good efficiency.

Accordingly, in Example 11 and Example 12 of the present invention, it was confirmed that by using an aluminosilicate catalyst that had been subjected to both the first and second phosphorus treatment steps, the hydrothermal stability increased and catalyst degradation was able to be suppressed, meaning BTX was able to be produced with good efficiency.

While preferred examples of the invention have been described above, the present invention is in no way limited by these examples. Additions, omissions, substitutions, and other modifications can be made without departing from the spirit or scope of the present invention. Accordingly, the invention is not to be considered as being limited by the foregoing description, and is only limited by the scope of the appended claims.

DESCRIPTION OF THE REFERENCE SIGNS

1: Method for producing monocyclic aromatic hydrocarbons having a carbon number of 6 to 8
2: Hydrogenation reaction device
3: Dehydrogenation tower
4: Cracking and reforming reaction device
5: Refining and collection device
6: BTX fraction collection tower
7: Gas separation tower
8: Recycling line

The invention claimed is:

1. A method for producing an aluminosilicate catalyst, comprising:
   a first phosphorus treatment step of treating a crystalline aluminosilicate with a first phosphorus compound, wherein the crystalline aluminosilicate comprises at least one component selected from the group consisting of medium pore zeolites and large pore zeolites as a main component,
   mixing a phosphorus-treated crystalline aluminosilicate obtained in the first phosphorus treatment step with a binder, molding a mixture of the phosphorus-treated crystalline aluminosilicate and the binder to form a molded body, and then firing the molded body, and
   a second phosphorus treatment step of treating the fired molded body with a second phosphorus compound.

2. The method for producing an aluminosilicate catalyst according to claim 1, wherein the crystalline aluminosilicate is an MFI zeolite.

3. The method for producing an aluminosilicate catalyst according to claim 1, wherein the binder comprises alumina.

4. The method for producing an aluminosilicate catalyst according to claim 1, wherein phosphoric acid is used as the second phosphorus compound.

5. The method for producing an aluminosilicate catalyst according to claim 1, wherein following the second phosphorus treatment step, a heat treatment is performed in an atmosphere containing water vapor.

6. A method for producing an aluminosilicate catalyst, comprising:
   a first phosphorus treatment step of treating a crystalline aluminosilicate with a first phosphorus compound, wherein the crystalline aluminosilicate is a pentasil zeolite,
   mixing a phosphorus-treated crystalline aluminosilicate obtained in the first phosphorus treatment step with a binder, molding a mixture of the phosphorus-treated crystalline aluminosilicate and the binder to form a molded body, and then firing the molded, and
   a second phosphorus treatment step of treating the fired molded body with a second phosphorus compound.

7. The method for producing an aluminosilicate catalyst according to claim 6, wherein the binder comprises alumina.

8. The method for producing an aluminosilicate catalyst according to claim 6, wherein phosphoric acid is used as the second phosphorus compound.

9. The method for producing an aluminosilicate catalyst according to claim 6, wherein following the second phosphorus treatment step, a heat treatment is performed in an atmosphere containing water vapor.

* * * * *